(12) United States Patent
Gruhn et al.

(10) Patent No.: US 10,118,233 B2
(45) Date of Patent: Nov. 6, 2018

(54) DEVICE FOR USE IN DRILLING, METHOD FOR DRILLING, AND METHOD FOR PREPARING A WORKPIECE OR AN ARRANGEMENT OF WORKPIECES FOR DRILLING

(71) Applicant: Airbus Operations GmbH, Hamburg (DE)

(72) Inventors: Ralf Gruhn, Hamburg (DE); Anna Klauser, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 14/939,356

(22) Filed: Nov. 12, 2015

(65) Prior Publication Data

US 2016/0136738 A1 May 19, 2016

(30) Foreign Application Priority Data

Nov. 13, 2014 (EP) ..................... 14193007

(51) Int. Cl.
B23B 49/02 (2006.01)
B23B 47/28 (2006.01)
B23B 51/00 (2006.01)

(52) U.S. Cl.
CPC ............ B23B 49/023 (2013.01); B23B 47/28 (2013.01); B23B 51/0054 (2013.01);
(Continued)

(58) Field of Classification Search
CPC .......... B23B 2215/04; B23B 2260/026; B23B 51/0054; B23B 49/023; B23B 47/287;
(Continued)

(56) References Cited

U.S. PATENT DOCUMENTS 2,375,112 A * 5/1945 Kanihan ............... B23B 47/284
408/112
2,383,953 A * 9/1945 Beard .................. B23B 47/284
29/426.5
(Continued)

FOREIGN PATENT DOCUMENTS

CN 201711571 U 1/2011
DE 20 2014 100293 U1 3/2014
(Continued)

OTHER PUBLICATIONS

Extended European Search Report for Application No. 14193007 dated Apr. 28, 2015.
(Continued)

*Primary Examiner* — Daniel Howell
*Assistant Examiner* — Chwen-Wei Su
(74) *Attorney, Agent, or Firm* — Jenkins, Wilson, Taylor & Hunt, P.A.

(57) ABSTRACT

A device for use in drilling is adapted to be used in cooperation with a drilling unit that comprises a bush inside which a drill bit can advance and retract relative to the bush, the bush being provided with an opening from which the drill bit can protrude towards a workpiece or an arrangement of workpieces. The device includes a first portion and a second portion. The first portion is formed so as to fit into the opening of the bush. The second portion is formed so as to fit into a pre-drilled pilot hole in the workpiece or in at least one workpiece of the arrangement.

16 Claims, 5 Drawing Sheets

(52) U.S. Cl.
CPC ....... *B23B 2215/04* (2013.01); *B23B 2226/61* (2013.01); *B23B 2260/026* (2013.01); *Y10T 408/559* (2015.01); *Y10T 408/568* (2015.01); *Y10T 408/569* (2015.01)

(58) Field of Classification Search
CPC ..... B23B 47/28; B23B 47/12; B23B 2247/12; Y10T 408/559; Y10T 408/568; Y10T 408/567; Y10T 408/569
See application file for complete search history.

(56) References Cited

U.S. PATENT DOCUMENTS

| | | | | |
|---|---|---|---|---|
| 2,576,786 | A * | 11/1951 | Gray | B23B 47/284 408/112 |
| 2,830,377 | A * | 4/1958 | Wenz | 33/638 |
| 3,129,614 | A | 4/1964 | Dowdakin | |
| 4,303,133 | A | 12/1981 | Godolphin | |
| 5,279,024 | A * | 1/1994 | Zieve | B21J 15/02 227/51 |
| 5,820,314 | A * | 10/1998 | Dunbar | B23B 47/28 408/115 B |
| 6,435,782 | B1 * | 8/2002 | Hillhouse | B23B 47/284 29/402.03 |
| 6,602,027 | B2 * | 8/2003 | Deaton | B23B 49/026 16/223 |
| 7,758,288 | B2 * | 7/2010 | Takahashi | B23B 49/00 33/638 |

FOREIGN PATENT DOCUMENTS

| | | |
|---|---|---|
| GB | 2 472 230 A | 2/2011 |
| GB | 2 500 910 A | 10/2013 |

OTHER PUBLICATIONS

Chinese Office Action for Application No. 2017062801844570 dated Jul. 3, 2017.

* cited by examiner

DEVICE FOR USE IN DRILLING, METHOD FOR DRILLING, AND METHOD FOR PREPARING A WORKPIECE OR AN ARRANGEMENT OF WORKPIECES FOR DRILLING

CROSS-REFERENCE TO RELATED APPLICATION

This application claims priority to EP 14 193007.3 filed Nov. 13, 2014, the entire disclosure of which is incorporated by reference herein.

TECHNICAL FIELD

The disclosure herein relates in general to drilling, and in particular relates to a device for use in drilling, to a method for drilling using a drilling unit, in particular in the field of aircraft or spacecraft production, and to a method for preparing a workpiece or an arrangement of workpieces for drilling.

BACKGROUND

Although the present disclosure may be useful in connection with various kinds of drilling processes, in particular for drilling holes into or through a great variety of workpieces, the present disclosure and the underlying problem will be explained in more detail hereinafter with respect to the drilling of through-holes through workpieces comprising one or more comparatively thin layers of material, in particular in the field of aircraft or spacecraft manufacturing.

For example, during an assembly procedure in aircraft production, sometimes, a workpiece or arrangement made up of two layers of material, one of which comprises a pre-drilled pilot hole, has to be drilled through, so that a through-hole of desired diameter is formed through both layers, preferably as exactly as possible at the position of the pilot hole.

An existing method for drilling exists according to which a semi-automatic drilling unit is used to perform the drilling step. Before initiating the drilling step, the semi-automatic drilling unit has to be positioned and aligned by the worker with respect to the workpiece or arrangement, e.g. a workpiece or arrangement of workpieces comprising a stack of two layers of material.

However, positioning the semi-automatic drilling unit (ADU) is rather difficult, and it is therefore time-consuming to precisely position a drill bit of the ADU with respect to the pilot hole in order to produce a drilled hole that meets the requirements concerning the precision of positioning and the hole quality.

Drilling precise holes of high quality is particularly fiddly, using the existing method noted above, if the workpiece comprises one or more rather thin layers, and in particularly if the layer provided with the pre-drilled pilot holes is very thin.

In such a case, because of the small thickness of a layer of material having the pilot hole, guidance of a drill point of the drill bit at the beginning of the drilling operation is limited. Therefore, care must be taken in order to precisely position the drilling unit relative to the workpiece in order to produce holes through the layer and through a second layer having the right hole dimensions and sufficient hole quality and ensure that the holes are positioned and aligned as required. This is time-consuming.

Moreover, drilling such holes is particularly demanding if the layers to be drilled through comprise one or more layers made of fiber-reinforced composite materials, such as hybrid stacks including layers of fiber-reinforced composite material and layers of metal. However, oversized holes, double holes, delaminations and/or fraying of the hole edges are to be avoided.

SUMMARY

It is an idea of the present disclosure to facilitate the positioning of a drilling unit with respect to a workpiece or an arrangement of workpieces, in particular a workpiece or arrangement of workpieces comprising layers stacked one on top of another, at least one of which is rather thin. Moreover, the quality of the holes that are drilled should be improved.

Accordingly, the disclosure herein discloses a device for use in drilling which is adapted to be used in cooperation with a drilling unit that comprises a bush inside which a drill bit can advance and retract relative to the bush. The bush of the drilling unit is provided with an opening from which the drill bit can protrude towards a workpiece or an arrangement of workpieces. The device comprises a first portion which is formed so as to fit into the opening of the bush. Furthermore, the device comprises a second portion which is formed so as to fit into a pre-drilled pilot hole in the workpiece or in at least one workpiece of the arrangement.

According to the disclosure herein, there is also provided a method for drilling using a drilling unit, in particular in the field of aircraft or spacecraft production. The drilling unit comprises a bush inside which a drill bit can advance and retract relative to the bush, the bush being provided with an opening from which the drill bit can protrude towards a workpiece or an arrangement of workpieces. According to the disclosure herein, the method comprises a step of drilling by the drill bit, wherein the step of drilling includes drilling through a device, wherein the device comprises a first portion formed so as to fit into the opening of the bush and wherein the device comprises a second portion formed so as to fit into a pre-drilled pilot hole in the workpiece or in at least one workpiece of the arrangement, the first portion being arranged within the opening and the second portion being arranged within the pre-drilled pilot hole.

Moreover, the disclosure herein discloses a method for preparing a workpiece or an arrangement of workpieces for drilling. The method for preparing comprises inserting the second portion of a device in accordance with the disclosure herein into a pre-drilled pilot hole in the workpiece or in at least one workpiece of the arrangement, whereby a workpiece or arrangement of workpieces is provided that is pre-equipped with the device for a drilling operation to be performed.

One idea underlying the present disclosure is that the positioning of a drilling unit, for example a semi-automatic drilling unit, and therefore also the positioning of the drill bit relative to the workpiece or arrangement can be significantly simplified and facilitated, and hence can be achieved much more quickly, by using a device which has two particular portions, one portion fitting into the pre-drilled pilot hole, and another portion fitting into the opening of the bush. Thus, one advantage of the disclosure herein is that a lengthy and difficult procedure of trying to correctly insert a drill point into the pilot hole can be avoided, which also means that the risk of scratching or otherwise damaging the surface of a workpiece around the pilot hole is significantly reduced. Moreover, the precise positioning of the drill bit helps to optimize the entry of the drill point into the material or materials to be drilled through at the target rotational speed and the target infeed velocity. Further, because using the device of the disclosure herein, the drill bit enters the material or materials in an optimized manner, the chances of delaminations or frayed hole edges, incorrectly sized holes, or misaligned holes due to deviation or drifting of the drill bit because of insufficient guidance thereof are significantly reduced. Therefore, neatly drilled holes are obtained, which results in a quality improvement as well as significantly reduced effort for documenting and/or repairing holes that deviate in dimension, position or quality, for example. As an additional advantage, the improved drilling procedure may also result in a longer service life of the drill bit, which may help to reduce the costs involved.

The method for preparing a workpiece or an arrangement of workpieces for drilling, as proposed by the present disclosure, makes it possible to achieve the afore-mentioned advantages obtained by using the device in a particularly economical, cost-effective way.

Advantageous improvements and developments of the disclosure herein are contained in the disclosure herein as well as in the description, which refers to the figures of the drawings.

According to a development, the device is a device for one-time use. Each time a hole is drilled, the use of the device thereby results in the same advantageous, combined effect of improved positioning and guidance of the drill bit.

In particular, in accordance with a development, the first and second portions of the device may be arranged in such a manner that, during drilling into and/or through the workpiece or the arrangement of workpieces using the drill bit, material of the device is removed by drilling through the device when the device is used in cooperation with the drilling unit. This further contributes to an improved guidance of the drill bit as the drill bit advances and the drill point enters the material of the workpiece, and thereby further helps to avoid drilled holes of insufficient quality and to prevent delaminations and frayed or misaligned holes. Vibrations of the drill bit during drilling may be reduced by drilling through the device.

According to a further development, the first portion or the second portion comprises a substantially cylindrical outer surface. Alternatively, the first and the second portion each may comprise a substantially cylindrical outer surface. This may help to improve fitting the first portion into the opening of the bush and fitting the second portion of the device into the pre-drilled pilot hole, and hence may help to improve the alignment and positioning of the drilling unit, the device and the workpiece or arrangement of workpieces with respect to each other.

In particular, the first and/or second portion each may substantially be shaped in the form of a straight circular cylinder.

According to a further development, the first and second portions are arranged so as to be substantially coaxial to each other. This makes it possible to easily achieve a coaxial alignment of the bush of the drilling unit and the pre-drilled pilot hole in the workpiece.

In accordance with another improvement, the first portion of the device has a radial extent that is larger than a radial extent of the second portion. In this way, when drilling is performed using a step drill that advances inside the bush of the drilling unit, wherein the step drill has a diameter approximately corresponding to the diameter of the pilot hole in a first section, and wherein the step drill has a larger diameter in a second section following the first section thereof, the first section of the step drill (which may also be termed a pilot section of the drill) can be guided when drilling through the device by remaining material of the first portion of the device, while the second portion inside the pre-drilled pilot hole is removed substantially entirely by the drill bit. Guidance of the drill bit during drilling is thereby improved and vibrations thereof are avoided or reduced.

In particular, the first portion may be provided with a diameter which is greater than a diameter of the second portion.

According to a further development, the device further comprises a disc-shaped portion, wherein the first and second portions axially extend from opposite sides of the disc-shaped portion. Such a disc-shaped portion may be useful in particular for preventing scratches on the surface of the workpiece or one of the workpieces during positioning of the drilling unit and/or during drilling.

In particular, the disc-shaped portion radially extends beyond each of the first and second portions. Accordingly, the disc-shaped portion may advantageously be used as a support for the bush of the drilling unit and may, for example, be arranged between the bush and the workpiece or arrangement of workpieces so as to avoid surface damage.

According to a development, the disc-shaped portion may comprise a substantially circular circumference and may, in particular, be arranged substantially coaxially with the first and second portions.

In particular, according to a development, the device as a whole may be formed so as to be axially symmetrical. Manufacturing and handling of such a device may be particularly easy and convenient.

In a development, the disc-shaped portion has a diameter which is greater than a diameter of the first portion and greater than a diameter of the second portion. In this way, the disc-shaped portion may be particularly effective for protecting the workpiece surface against scratches.

Moreover, in a further advantageous development, the disc-shaped portion may have a diameter which is greater than an outer diameter of the bush at a front end of the bush, where the opening of the bush is located. In particular, the disc-shaped portion may be adapted to partially or entirely cover a front end of the bush during the drilling operation. By choosing the diameter of the disc-shaped portion in this manner and/or by entirely or completely covering the front end of the bush, the surface of the workpiece facing the drilling unit during drilling may be protected against damage and scratching even more effectively.

In accordance with a further improvement, an outer edge of the first portion or an outer edge of the second portion or outer edges of both the first and second portions is/are provided with a chamfer or with a radius. In this manner, the insertion of the second portion into the pre-drilled pilot hole and the placing of the bush onto the first portion can be facilitated, whereby the drilling unit can also be positioned even more quickly, easily and safely.

In accordance with a further improvement, the device is formed from a material which is softer than the material of at least one layer which forms part of the workpiece or the arrangement of workpieces. For example, the material from which the device is formed may be softer than the material of a layer which comprises the pre-drilled pilot hole and/or of another layer of the workpiece or arrangement. This may further improve guidance of the drill bit and may contribute to the dampening of vibrations of the drill bit during drilling. Better guidance and less vibration further contribute to obtaining a neatly drilled and precisely positioned hole.

In accordance with a further development, the device may be formed from a synthetic material. Choosing a synthetic material may help to obtain a device which is sufficiently soft, provides sufficient guidance for the drill bit and can be provided at appropriate cost.

In particular, in accordance with further improvements, the material of the device is chosen so as to be adapted to the rotational speed of the drill bit during drilling, which is to be selected for drilling into or through the workpiece or the arrangement of workpieces. In particular, the material of the device may be chosen so as to be adapted to the material/materials of the workpiece/workpieces, in particular by being adapted to the rotational speeds required in connection with the material or materials of the workpiece or arrangement of workpieces. In cases in which the workpiece or arrangement of workpieces comprises a stacked arrangement of two or more layers of the same or different materials, the material of the device may be adapted to the combination of materials of the layers that are to be drilled into or through. Selecting the material of the device in this manner helps to achieve the required guidance of the drill bit while avoiding, for example, overheating of the device and partial melting of the material thereof.

According to a development, the device is formed in one piece. This may facilitate manufacturing of the device.

In accordance with another development, the device is formed as a solid body. Therefore, according to this development, the device in particular does not comprise a central hollow or passage. The drill bit therefore is guided and its vibrations are attenuated as the drill bit works through the solid device when drilling.

According to a development, the synthetic material from which the device is formed may be polyoxymethylene, which may be called POM in abbreviated manner, and which is sometimes also designated as polyacetal. However, other synthetic materials may be used, e.g. depending on the rotational speed of the drill bit chosen for drilling.

It is in particular conceivable, in further developments, to provide the device with at least one suitably arranged breaking area or breaking point or breaking line where the device is designed to rupture when a defined mechanical stress applied to the device is exceeded. Such a breaking area, point or line may be provided in order to avoid overheating and melting of the device during drilling.

It is emphasized that the above-described developments and improvements of the device may also apply to the device as used in the method for drilling proposed by the disclosure herein, and also may be applied to the device used in the proposed method for preparing a workpiece or arrangement of workpieces.

In accordance with an improvement of the method for drilling, the method for drilling includes positioning the drill bit relative to the workpiece or the arrangement of workpieces by placing the bush of the drilling unit onto the device, prior to the step of drilling. In this way, the drilling unit can be easily and quickly positioned.

In particular, in accordance with a development of the method for drilling, the second portion of the device is inserted into the pre-drilled pilot hole prior to the step of drilling, and preferably prior to positioning the drill bit by placing the bush onto the device. In this way, for example, the workpiece or the arrangement of workpieces may be pre-equipped with one or more of the devices, which contributes to an even more economical and cost-effective process of producing the desired drilled holes.

In a development of the method for drilling, the workpiece or arrangement of workpieces comprises at least two layers of material. The at least two layers of material form a stacked arrangement. Prior to the step of drilling, a first layer of the stacked arrangement comprises the pre-drilled pilot hole. In particular, prior to the step of drilling, a second layer of the stacked arrangement covers the pre-drilled pilot hole on one side of the first layer. The first layer of the stacked arrangement may, for example, be an outer layer of the stacked arrangement. The stacked arrangement may comprise, according to various developments, two layers of material or more than two layers of material. The workpiece may be a workpiece having two layers or more than two layers of material. The arrangement of workpieces may comprise two or more workpieces, e.g. each having a single layer, arranged with respect to each other and jointly to be drilled into or through.

In accordance with different developments of the method for drilling, the layers may have the same or different thicknesses. As an example, the first layer comprising the pre-drilled pilot hole may have a thickness that is smaller than the thickness of the second layer, but other relations of layer thicknesses may be chosen instead. The method of the disclosure herein in particular is advantageous in cases in which the first layer is thin.

According to a development of the method for drilling, the step of drilling includes forming a through-hole through the stacked arrangement so that the axis of the through-hole substantially corresponds to the axis of the initial pre-drilled pilot hole. Thus, the position of the through-hole formed through the stacked arrangement is precisely defined by the pilot hole. In particular, the pilot hole may be enlarged during the step of drilling, for example up to the desired final dimension of the through-hole.

In accordance with a development of the method for drilling, at least one of the layers of material is formed from a fiber-reinforced composite material, or at least one of the layers of material is formed from a metal material. Alternatively, at least one of the layers may be formed from a fiber-reinforced composite material while at least one other of the layers is formed from a metal material.

According to a further development of the method for drilling, the first layer, comprising the pre-drilled pilot hole, is formed from a fiber-reinforced composite material or from a metal material.

According to a further development, the second layer is formed from a fiber-reinforced composite material or from a metal material.

In particular, according to a development, the first and second layer each may be formed from a fiber-reinforced composite material, or each may be formed from a metal material.

According to various developments, the first layer is made from a metal material and the second layer is made from a fiber-reinforced composite material, or, alternatively, the second layer is made from a metal material and the first layer is made from a fiber-reinforced composite material.

In accordance with a further development of the method for drilling, a fiber-reinforced composite material from which one or more of the layers is or are formed may be a carbon fiber reinforced synthetic material.

According to still further developments, a metal material from which one or more of the layers is or are formed may comprise titanium or a titanium alloy or aluminum or an aluminum alloy.

In particular, according to further developments, the stacked arrangement of layers may comprise a layer of carbon fiber reinforced synthetic material and an adjacent layer of metal such as titanium, a titanium alloy, aluminum or an aluminum alloy. Such stacked arrangements may also be designated as multilayered hybrid stacks. Alternatively, the stacked arrangement may comprise two adjacent layers which are each made of a fiber-reinforced composite material such as carbon fiber reinforced synthetic material. The pre-drilled pilot hole may be formed in a layer made of fiber-reinforced composite material or in a layer made of metal.

In accordance with a further development of the method for drilling, the drill bit is a step drill. In particular, the step drill may comprise a first section, the diameter of which approximately corresponds to the diameter of the pre-drilled pilot hole, and a second section, having a diameter larger than the diameter of the first section.

According to a further development of the method for drilling, a remainder of the device is disposed of after completion of the step of drilling.

In accordance with a further development of the method for drilling, the drilling unit is a semi-automatic drilling unit, in particular a semi-automatic drilling unit of C-clamp type. According to a corresponding improvement of the device, the device is adapted to be used in cooperation with a semi-automatic drilling unit, for example of C-clamp type.

It should be understood that the device as proposed by the present disclosure may, in accordance with various developments of the disclosure herein, be adapted to be used in the methods proposed according to the disclosure herein. The device may be adapted to be used in drilling into or through workpieces having a single layer, for example made from a fiber-reinforced composite material, or into or through workpieces or arrangements of workpieces comprising a stacked arrangement according to at least one of the developments described above with reference to the method for drilling. In particular, the device may also be adapted for being used in drilling using a step drill.

It is noted that the device, the method for drilling and the method for preparing a workpiece or arrangement of workpieces may advantageously be used for drilling through single-layered workpieces, but are especially advantageous when used in drilling through-holes through stacked arrangements of layers, for example two-layered or multi-layered hybrid stacks including layers made from different materials. In cases in which one of the layers, particularly if this layer is rather thin, comprises a pre-drilled pilot hole while a second layer of material is still solid at a position corresponding to the position of the pilot hole, wherein a through-hole is to be produced through the stacked arrangement as exactly as possible at the position of the pilot hole, the device and method of the disclosure herein help to reliably avoid incorrectly drilled, misaligned or incorrectly positioned holes. In cases in which one or more of the layers comprise(s) fiber-reinforced composite material(s), delaminations and frayed edges can be avoided by the device and methods of the disclosure herein.

The developments, improvements and enhancements described above may be arbitrarily combined with each other whenever this makes sense. Moreover, other possible developments, enhancements and implementations of the disclosure herein comprise combinations of features of the disclosure herein which have been described above or will be described in the following in relation to the detailed description of embodiments, even where such a combination has not been expressly mentioned.

BRIEF DESCRIPTION OF THE DRAWINGS

The present disclosure will be explained in the following with reference to the schematic figures of the drawings which illustrate embodiments of the disclosure herein.

The enclosed drawings are intended to illustrate embodiments of the disclosure herein so that the disclosure herein may be further understood. The drawings, in conjunction with the description, are intended to explain principles and concepts of the disclosure herein. Other embodiments and many of the advantages described may be inferred from the drawings. Elements of the drawings are not necessarily drawn to scale.

Elements, features and components which are identical or which have the same function or effect have been labelled in the drawings using the same reference signs, except where explicitly stated otherwise.

DETAILED DESCRIPTION

Figure 1:
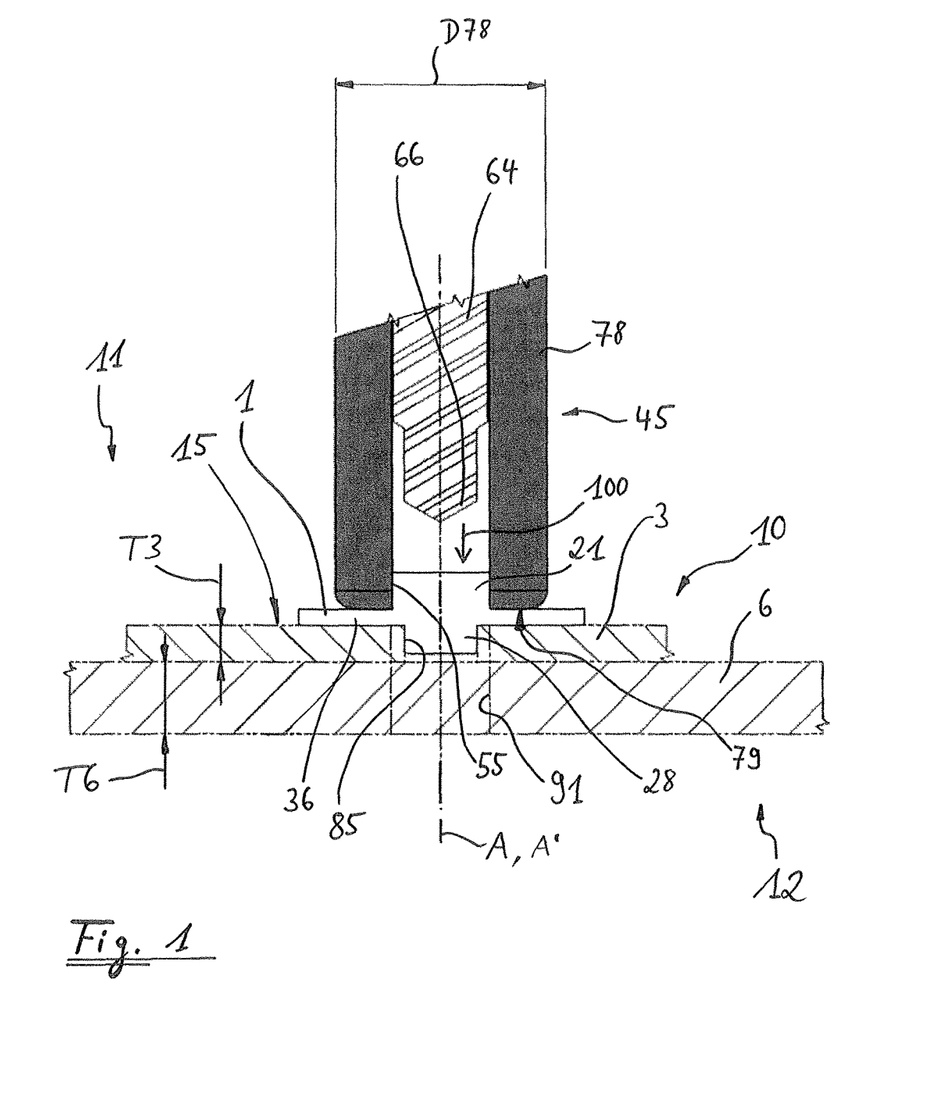
FIG. 1 displays, as a longitudinal section, a stacked arrangement of layers in partial view, a device for use in drilling, as well as a drilling head including a bush and a drill bit in partial view, in accordance with an embodiment of the present disclosure.

As shown in FIG. 1, a semi-automatic drilling unit, for example a drilling unit of C-clamp type, which is not displayed in FIG. 1 in its entirety, may comprise a drilling head 45, partially illustrated in FIG. 1, which is provided with a bush 78. In FIG. 1, the drilling head 45 is positioned in relation to a stacked arrangement 10 of a first layer of material 3 and a second layer of material 6 for drilling a through-hole through the arrangement 10.

The stacked arrangement 10 may be considered to correspond to a portion of a single workpiece comprising two layers 3 and 6. Alternatively, the stacked arrangement 10 may be considered an arrangement of a first layer 3 forming a first workpiece or part thereof and a second layer 6 forming a second workpiece or part thereof, wherein it is intended to drill through both workpieces jointly.

Drilling through the stacked arrangement 10 may be performed during aircraft or spacecraft production, for example during an assembly process of an aircraft. For example, the stacked arrangement 10 may be part of a frame coupling, such as a frame coupling in an aircraft fuselage.

In the embodiment of FIG. 1, the hole to be drilled is intended to have the desired final dimension, and is indicated in FIG. 1 by reference sign 91. In the state of FIG. 1, hole 91 has not yet been produced.

In FIG. 1, the first layer 3 is a layer of fiber-reinforced composite material such as a carbon fiber reinforced synthetic material, while the second layer 6 is, in the example of FIG. 1, a metal layer, made of titanium, a titanium alloy, aluminum or an aluminum alloy. However, in a variant, layer 6 may also be a layer of a fiber-reinforced composite material such as a carbon fiber reinforced plastic.

In a further variant, layer 3 may be a metal layer, e.g. made of Ti, a Ti-alloy, Al or an Al-alloy, while layer 6 is a layer made from a fiber-reinforced composite material such as a carbon fiber reinforced synthetic material. According to further variants, both layers 3 and 6 may be metal layers.

In the state of FIG. 1, the first layer 3 comprises a pre-drilled pilot hole 85. At a position corresponding to the position of the pilot hole 85, along the axis A of the hole 91 to be drilled, the second layer 6 is still solid and covers the pilot hole 85 on the lower side of the first layer 3 in FIG. 1. It is intended to transfer the position of the pilot hole 85 to the second layer of material 6 and thus to produce the hole 91 in such a manner as to be coaxial with the pre-drilled pilot hole 85, in other words, it is intended that the axis of the hole 91 corresponds to the axis of the pre-drilled pilot hole 85, as indicated by reference sign A.

FIG. 1 also shows a drill bit 64 arranged inside the bush 78, which can advance and retract along axis A relative to the bush 78. The bush 78 has an opening 55 in the region of a front end 79 of the bush 78. For drilling through the stacked arrangement 10, the drill bit 64 can protrude from the opening 55 towards and into the stacked arrangement 10.

A device 1 for use in drilling, which may also be designated as a drilling target or ADU target, is located partly between the bush 78 and the stacked arrangement 10. In detail, the device 1 comprises a first portion 21 which fits into the opening 55, preferably substantially without radial play, and the device 1 further comprises a second portion 28 which fits into the pre-drilled pilot hole 85, preferably substantially without radial play as well. In FIG. 1, the first portion 21 is arranged within and received inside the opening 55, while the second portion 28 is arranged within and received inside the pre-drilled pilot hole 85.

Figures 2, 3, 4, 5, 6, 7:
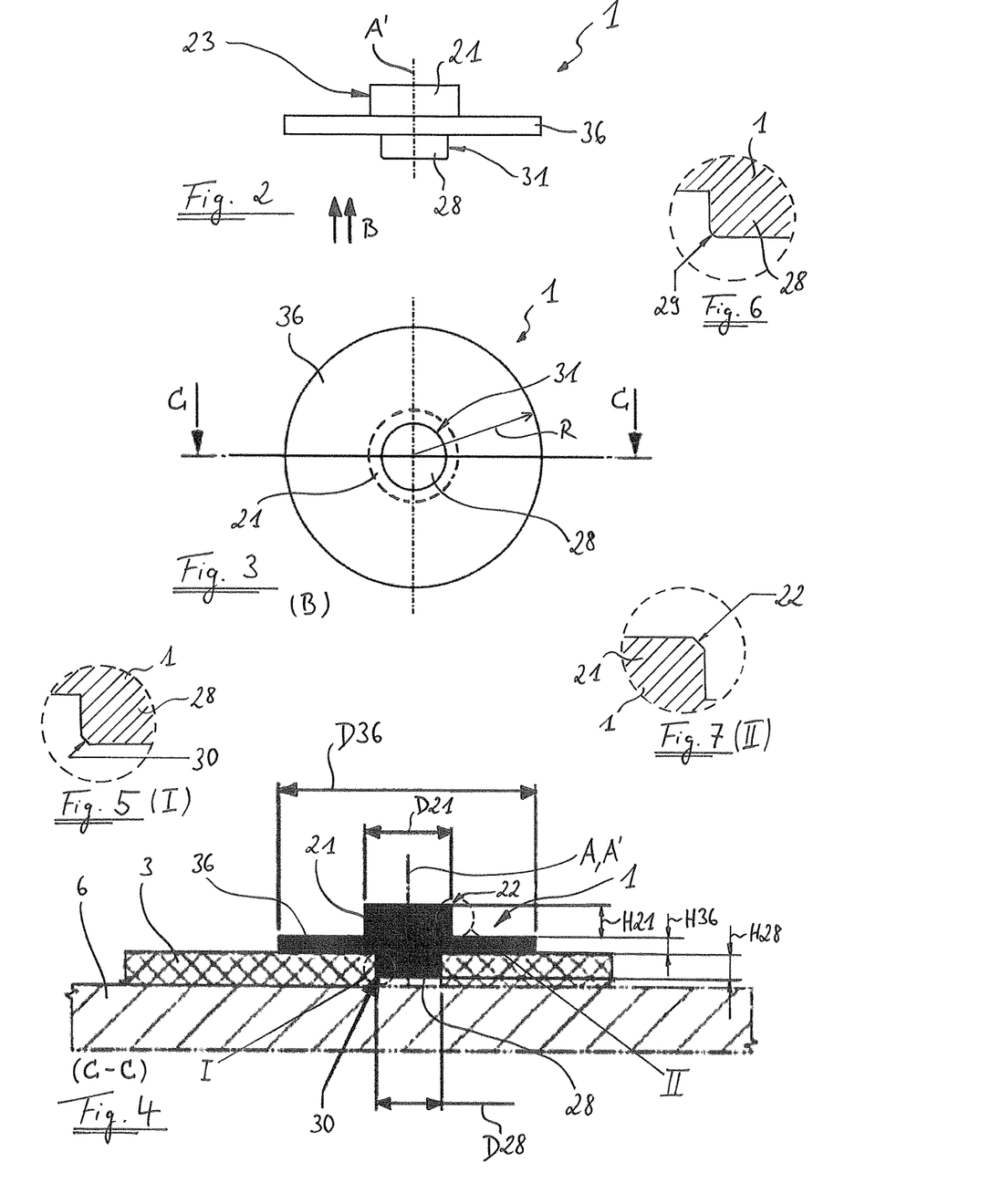
FIG. 2 shows the device according to the embodiment in a side view.
FIG. 3 shows the device of FIG. 2 in a bottom view B.
FIG. 4 displays a longitudinal section similar to the longitudinal section of FIG. 1, partially showing a stacked arrangement of layers and showing the device according to the embodiment, wherein dimensions of the device are illustrated.
FIG. 5 shows a detail view I of the device according to the embodiment.
FIG. 6 shows a detail view of the device, corresponding to detail view I, but in accordance with a variant of the embodiment.
FIG. 7 shows a detail view II of the device in accordance with the embodiment.

As may be appreciated from FIGS. 2-4, the device 1 is substantially axially symmetrical. The first portion 21 comprises a substantially cylindrical outer surface 23, and the second portion 28 comprises a substantially cylindrical outer surface 31. The first and the second portion 21, 28 each substantially have the shape of a straight circular cylinder, except for chamfers 22 and 30 which may be provided on outer edges of the first and second portions 22, 28, respectively. This is displayed schematically in FIGS. 5 and 7, which show longitudinal, partial sections of the device 1 according to the embodiment. Each of the chamfers 22, 30 may be replaced, if desired, by a suitable radius, for example. A radius 29 instead of the chamfer 30 is displayed in FIG. 6 for the second portion 28, in an exemplary manner and according to a variant. However, in accordance with the embodiment, a chamfer 22, 30 is preferred. In variants of the embodiment, only one of the chamfers 22, 30 may be provided.

The device 1 further comprises a disc-shaped portion 36 located between the first portion 21 and the second portion 28, so that the first and second portions 21 and 28 axially extend, along an axis A' of the device 1, from opposite sides of the disc-shaped portion 36.

The disc-shaped portion 36 is shaped as a flat circular cylinder, and therefore comprises a substantially circular circumference. The disc-shaped portion 36, the first portion 21 and the second portion 28 are arranged so as to be substantially coaxial to each other. Diameters of the various portions of the device 1 are indicated in FIG. 4. The diameter D21 of the first portion 21 is greater than the diameter D28 of the second portion 28. This means that the radial extent of the first portion 21 is greater than the radial extent of the second portion 28. In the embodiment, the diameter D21 approximately corresponds to an inner diameter of the opening 55, and D28 approximately corresponds to an inner diameter of the pilot hole 85.

Moreover, the diameter D36 of the disc-shaped portion 36 is greater than each of D21 and D28. Therefore, the radial extent of the disc-shaped portion 36 is greater than radial extents of each of the first and second portions 21, 28, whereby the disc-shaped portion 36 radially extends beyond each of the first and second portions 21, 28. An exemplary radial direction is indicated by R in FIG. 3. Heights of the first portion 21, the disc-shaped portion 36 and the second portion 28, namely H21, H36, H28, respectively, are indicated in FIG. 4 as well. As may also be appreciated from FIGS. 1 and 4, the diameter D36 of the disc-shaped portion 36 is greater than an outer diameter D78 of the bush 78.

The device 1 in accordance with the embodiment displayed in the Figures is formed in one piece from a synthetic material as a solid body. The synthetic material may be, for example, POM or polyoxymethylene (which is sometimes also called polyacetal). Thereby, the device 1 is formed from a material which is preferably softer than the material of layer 3 and/or layer 6, in particular softer than the layer 3 made from a carbon fiber reinforced synthetic material. In variants of the embodiment, the material of the device 1 may be softer than a metal material forming layer 3 and/or layer 6. The material properties of the device 1 may be selected depending on the layer structure of the stacked arrangement 10 and on the materials used for the layers thereof.

Figure 13:
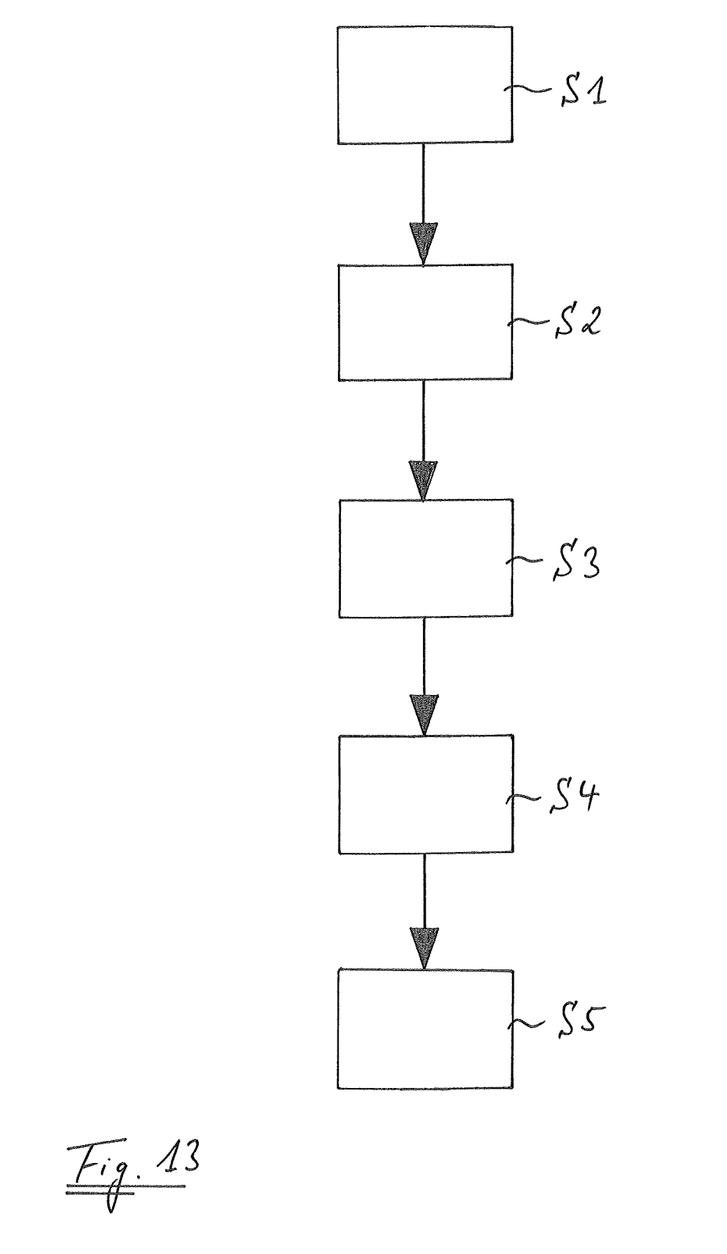
FIG. 13 schematically illustrates a method in accordance with an embodiment of the disclosure herein.

FIG. 13 schematically illustrates a method in accordance with the embodiment. In accordance with this method, in order to obtain the hole 91 through the stacked arrangement 10, the following steps are performed:

Step S1:

In a step S1, a device 1 or target, as described above, according to the embodiment is provided, and the second portion 28 is inserted into the pre-drilled pilot hole 85 in the first layer 3. The second portion 28 fits into the pilot hole 85 and may be dimensioned with respect to the pilot hole 85 in such a manner that upon insertion of the second portion 28 into the pilot hole 85, a slight press fit is obtained, so that, once inserted, the second portion 28 is held inside the pilot hole 85 without easily falling out of it in case the layer 3 or the workpiece comprising layer 3 is moved. The insertion of the second portion 28 into the pilot hole 85 is facilitated by the chamfer 30, displayed in FIG. 5. In this state, see FIG. 1, the disc-shaped portion 36 of the device 1 abuts against an outward-facing surface 15 of the first layer of material 3.

In cases in which the first layer 3 of the stacked arrangement 10 comprises a plurality of pre-drilled pilot holes 85, each of the pilot holes 85 may be provided with a device 1, by inserting the second portion 28 of the respective device 1 into the pilot hole. In this manner, a workpiece or arrangement of workpieces which is pre-equipped with the device 1 or with a plurality of devices 1 for one or more drilling operations to be performed later can be obtained. Equipping the stacked arrangement 10 with one or more devices 1 may, in the context of aircraft production, be performed inside a partially assembled fuselage section, for example. Alternatively, a pre-equipped workpiece, e.g. a workpiece comprising the first layer 3 but not the second layer 6, may be prepared separately and possibly be stored before further use or assembly. In other words, it is conceivable to pre-equip only part of the stacked arrangement 10, for example the first layer 3, with the device 1 or devices 1 and to intermediately store the pre-equipped part comprising layer 3 before further assembly, in particular before drilling using the device(s) 1. The first layer 3, may, for example, be a portion of a workpiece or component separately produced and later, during assembly of an aircraft or spacecraft, connected to another workpiece or component which comprises the second layer 6.

In a case in which only layer 3, as a separate piece, is pre-equipped with the devices 1, step S1 may be followed by an intermediate step, not shown in FIG. 13, of arranging the layers 3 and 6 suitably with respect to each other in order to form the stacked arrangement 10.

Figure 8:
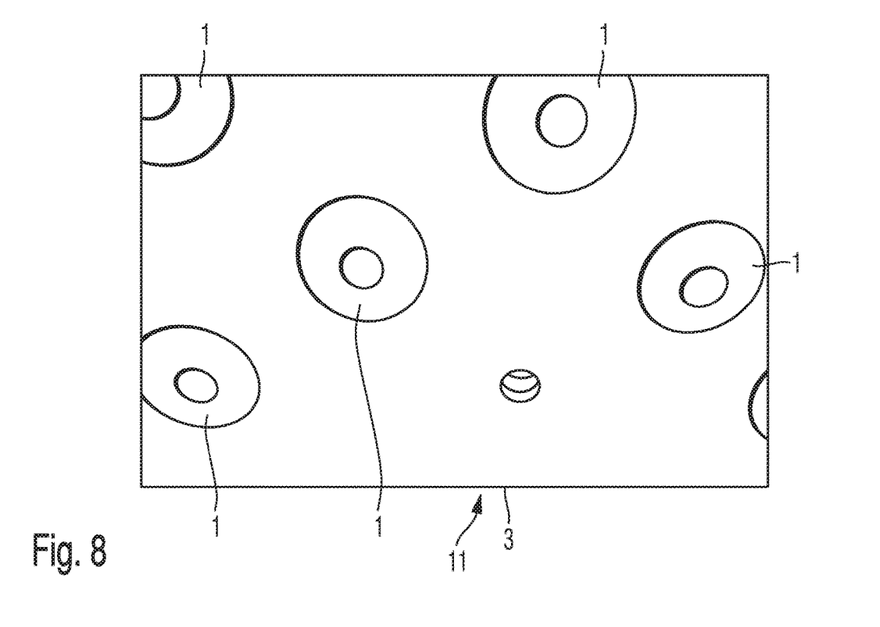
FIG. 8 shows a partial view of workpiece which is equipped with several devices for use in drilling according to the embodiment.

As previously mentioned, FIG. 8 shows several devices 1, the respective first portions 28 of which are each inserted into an associated pre-drilled pilot hole. In the case of FIG. 8, the first layer 3 is visible and consists of or comprises a carbon fiber reinforced synthetic material. Drilling will be performed, in this embodiment, from a first side 11 of the stacked arrangement 10, see FIGS. 1, 8 and 9.

Step S2:

In step S2, a semi-automatic drilling unit 46, sometimes designated by the abbreviation ADU, is positioned relative to the stacked arrangement 10, by placing the bush 78 onto the device 1 in such a manner that the first portion 21 of the device 1 is inserted into the opening 55 of the bush 78. Thereby, the bush 78 and thus the drill bit 64, shown in FIG. 1, are correctly positioned relative to the stacked arrangement 10. Due to the disc-shaped portion 36, which has a diameter D36 which is greater than the diameter D78 of the bush 78, bush 78 does not touch the surface 15 of the first layer 3, but abuts against the disc-shaped portion 36. Thereby, the surface 15 of the layer 3 is effectively protected against damage and scratches. The disc-shaped portion 36, in the state of FIG. 1, thus covers the front end 79 of the bush 78. With the help of the device 1, the C-clamp-type semi-automatic drilling unit 46 (ADU) is thus easily, quickly and precisely positioned relative to the stacked arrangement 10 by a worker, and the drilling unit 46 and drill bit 64 are correctly aligned and centred with respect to the pre-drilled pilot hole 85.

Figure 9:
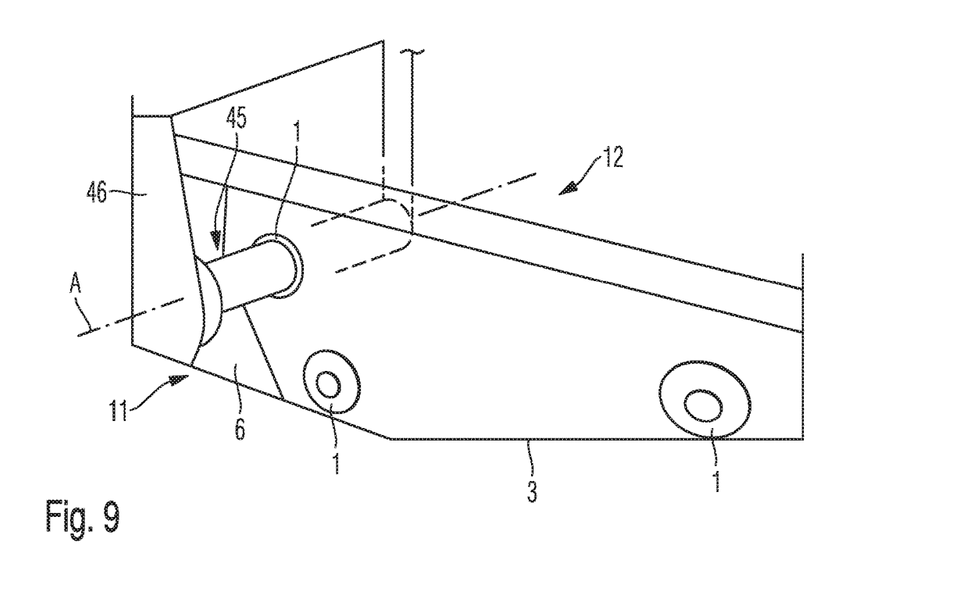
FIG. 9 shows a partial view of an arrangement of workpieces during a drilling step, a semi-automatic drilling unit also being shown partially.

Placing the bush 78 onto the device 1 may be facilitated by the chamfer 22, see FIG. 7. FIG. 9 shows the semi-automatic drilling unit (ADU) 46 in a state in which its drilling head 45 is placed, with its bush 78, onto a device 1, the drilling unit 46 thereby being positioned relative to the workpiece 10, and the drilling unit 46 being clamped against the workpiece. The C-type clamping from the first side 11 and from a second side 12 of the stacked arrangement 10 is schematically indicated in FIG. 9.

Step S3:

As can be appreciated from FIG. 1, the drill bit 64 which can advance and retract inside the bush 78 is a step drill or subland drill, having a first section of smaller diameter on which is formed the drill point 66, and having a subsequent section of larger diameter.

In step S3, a drilling operation is initiated, which means that the drilling unit 46 advances the drill bit 64 in direction 100 at a predefined infeed velocity, while the drill bit 64 rotates at a predefined, suitably selected rotational speed.

During the drilling operation, the drill point 66 first touches the first portion 21 of the device 1 and, during further advancement of the drill bit 64, an inner part of the first portion 21 and the disc-shaped portion 36 as well as substantially the complete second portion 28 are machined, so that material of the device 1 is removed by drilling through the device 1. What remains of the first portion 21 is subsequently removed by drilling as the drill bit 64 further advances. During the process, the pilot hole 85 is enlarged and a hole 91, for example a hole having a desired final diameter, is obtained through the layers 3 and 6, as indicated schematically by reference sign 91 in FIG. 1.

It can thus be seen that the device 1 for use in drilling has, on the one hand, a function of correctly positioning the bush 78 and thus the drill bit 64, but also helps to guide the drill bit 64 as the drill bit 64 enters into the material of the layers 6 and 3 of the stacked arrangement 10 and drills through them. Hence, by the improved positioning and guiding of the drill bit 64 during drilling, the entry of the drill bit 64 into the material is optimized. Incorrectly placed, misaligned, wrongly dimensioned or frayed holes are thereby avoided, and delaminations in fiber-reinforced materials are prevented. The surface 15 of layer 3 is protected against scratches during positioning and drilling. As the quality of the drilled holes 91 is significantly improved, paperwork for documenting deviations and effort for repairing incorrectly drilled holes or surface damages is significantly reduced. Moreover, the service life of the drill bit 64 may be lengthened, which may further reduce cost. As described above, the material chosen for the device 1 helps, in combination with the geometry of the device 1, to attenuate vibrations of the drill bit 64.

Figure 12:
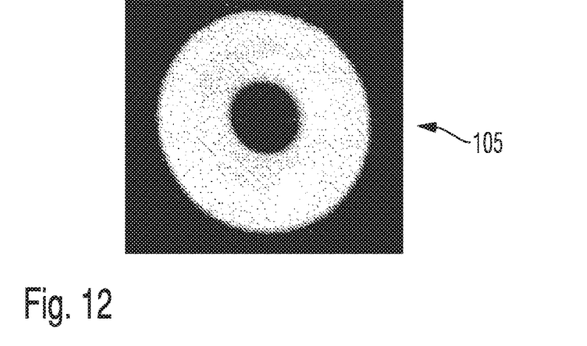
FIG. 12 shows a remainder of a device according to the embodiment after completion of the drilling step.

Thus, it can be seen that the device 1, to be used in cooperation with the drilling unit 46, is a device for a one-time use. FIG. 12 shows a remainder 105, which substantially has the form of a ring.

Step S4:

In step S4, the clamping force of the C-clamp drilling unit 46 is deactivated, so that the drilling unit 46 may be removed from the stacked arrangement 10 or may be moved to another device or ADU target 1. In the course of this, the remainder 105 may either drop down from the stacked arrangement 10 and may be collected afterwards, or the remainder 105 might either remain on the drilling head 45 or on the first layer 3. In case the remainder 105 remains on the layer 3 or on the drilling head 45, it may be easily removed therefrom, for example manually, and disposed of. Preferably, no part or remainder of the device 1 remains in or on the stacked arrangement 10 after the hole 91 is finished and the work space has been cleaned.

Step S5:

In step S5, further operations regarding the drilled hole 91 may be performed, such as deburring the hole 91, checking the size and shape of the hole 91 using a suitable gauge if desired, or the like.

In case the device 1 is used in cooperation with a drilling unit 46 in order to drill holes during assembly of an aircraft fuselage, for example, the disclosure herein has the further advantage that the remainder 105 of each of the devices 1 is quite well visible and can help the worker to find and remove the swarf created during drilling. The remainders 105 thus may, for example, mark spots inside the partially assembled fuselage which may have to be cleaned with especial care, e.g. using an aspirator or similar.

Figures 10, 11:
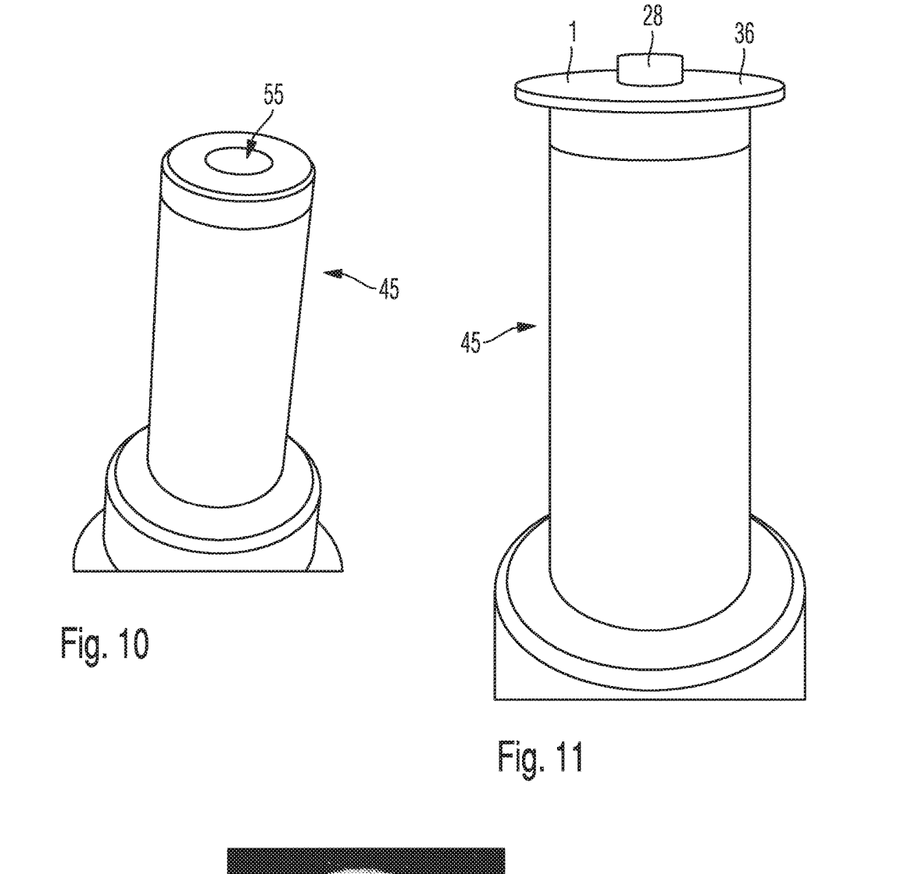
FIG. 10 shows an example of a drilling head, which may be used in cooperation with the device in accordance with the embodiment.
FIG. 11 shows the drilling head of FIG. 10 and a device in accordance with the embodiment placed on top of the drilling head, in accordance with a laboratory test.

FIGS. 10 and 11 show the drilling head 45 in order to clearly illustrate how the first portion 21 fits into the opening 55 when the drilling head 45 is placed onto the device 1. However, FIG. 11 shows the device 1 placed onto the drilling head 45 in the course of a laboratory test.

For an application in manufacturing and/or assembly, for example during assembly of an aircraft fuselage or the like, it is however preferred to first place the devices or targets 1 onto the first layer 3 and insert the second portions 28 into the respective pilot holes 85 in order to pre-equip the layer 3 before placing the bush 78 of the drilling head 45 successively onto the devices 1.

It is noted that, although polyoxymethylene may be used as a material for the device 1, other materials may be chosen depending on the rotational speeds that have to be selected for the drill bit 64, wherein the rotational speeds may depend on the materials or material combinations selected for the layers 3 and 6. In particular, the material of the device 1 may be selected so as to avoid melting of parts of the device 1.

For the arrangement illustrated in FIG. 1, with a first layer 3 of carbon fiber reinforced synthetic material, a second layer 6 of titanium or a titanium alloy, and a device 1 made from POM, the rotational speed may, for example, be selected between 600 and 800 revolutions per minute, e.g. approximately 700 revolutions per minute. Other materials may require other rotational speeds, such as, for example, rotational speeds of 4000 or 5000 revolutions per minute. A material for the device 1 could then be selected which is appropriate for the higher rotational speeds.

Moreover, it is conceivable to provide the device 1 at a suitable location with one or more breaking points, breaking lines or breaking areas, not shown in the Figures, in which the device 1 may be designed to rupture in case predefined mechanical stresses are exceeded, in order to avoid such overheating and melting.

It should be noted that the device 1 according to the embodiment may not only be useful in drilling through arrangements of two or more layers, but may also be useful if a single, thin layer, in particular made from a fiber-reinforced composite material such as carbon fiber reinforced synthetic material, should be drilled through.

Moreover, it must be emphasized that the device 1 may be inserted, with its second portion 28, into a pre-drilled hole 85 in a fiber-reinforced composite layer or in a metal layer, depending on from which side of a workpiece or arrangement of workpieces comprising a stacked arrangement of layers, the drilling should be performed.

Thicknesses T3 and T6 of the first layer 3 and the second layer 6, respectively, are indicated in FIG. 1, and can, for example, each be in the range of several millimeters. T3 may be smaller than T6, as illustrated in FIG. 1. T3 could be two to three millimeters, for example. The thicknesses T3 and T6 may also be, in variants, substantially equal, or T6 may be smaller than T3. The disclosure herein may be useful in any of these cases, but is particularly advantageous when T3 is rather small.

The disclosure herein thus provides a device and methods which facilitate increasing the diameter of pilot holes 85 in thin layers 3 of material and, at the same time, transferring the position of the hole to a second material layer 6, which is solid, behind the pre-drilled pilot hole 85.

The heights H21, H36 and H28 of the first portion 21, the disc-shaped portion 36 and the second portion 28, respectively, may be chosen depending on the desired guidance of the drill bit 64 and on the available space, e.g. the thickness T3 of the first layer 3, for example. It is noted that in an idle position, before the drilling operation is initiated, the drill point 66 is positioned inside the bush 78 a predetermined distance from the front end 79 towards the rear of the bush 78, along the axis A, in order to create enough space between the front end 79 and the drill point 66 for the first portion 21 and in order to make it possible to insert the first portion 21 into opening 55. As the drill point 66 is placed inside the bush 78 in the idle state, scratching of the surface 15 by the drill point 66 is even more effectively prevented.

In accordance with an example, the device 1 of FIG. 4 may be formed in such a manner that H21 approximately is 2.0 mm, H36 approximately is 1.0 mm, and H28 approximately is 1.5 mm. D36 may, in this example, be approximately 16.0 mm. D28 may, in this example, be approximately 4.1 mm, and D21 may be, for example, 5.5 mm or 5.7 mm. The chamfers 22, 30 may be, for example, chamfers of 0.3 mm×45°. Instead, the radius 29 according to the variant may be a radius of 0.2 mm or a larger radius.

In case it is desired to prevent the remainders 105 of the devices 1 from falling down from the workpiece, it may be envisaged to provide the device(s) 1 with an adhesive so that after drilling, the remainder 105 remains adhered to the workpiece, e.g. to layer 3. Preferably, in this case, an adhesive is chosen that can easily be removed from the workpiece without residue.

Although the disclosure herein has been completely described above with reference to preferred embodiments, the disclosure herein is not limited to these embodiments but may be modified in many ways. Although the disclosure herein may be particularly useful in the field of manufacturing of aircraft or spacecraft, the disclosure herein may nevertheless be advantageously used in other fields of technology as well.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A device for drilling, wherein the device is adapted to be used in cooperation with a drilling unit that comprises a bush inside which a drill bit can advance and retract relative to the bush, the bush being provided with an opening in a region of a front end of the bush, wherein the drill bit can protrude from the opening towards a workpiece or an arrangement of workpieces, the device comprising a first portion which is formed so as to fit into the opening of the bush, the device comprising a second portion which is formed so as to fit into and to be inserted into a pre-drilled pilot hole in the workpiece or in at least one workpiece of the arrangement;

wherein the device further comprises a portion adapted to partially or entirely cover the front end of the bush during the drilling operation; and wherein the device is a device for one-time use, and wherein the first and second portions are arranged such that, during drilling into or through the workpiece or arrangement of workpieces using the drill bit, material of the device is removed by drilling through the device when the device is used in cooperation with the drilling unit.

2. The device according to claim 1, wherein the first and second portions are arranged so as to be substantially coaxial to each other.

3. The device according to claim 1, wherein the first portion has a radial extent that is larger than a radial extent of the second portion.

4. The device according to claim 1, wherein the portion of the device that is adapted to partially or entirely cover the front end of the bush during the drilling operation is a disc-shaped portion, the first and second portions axially extending from opposite sides of the disc-shaped portion.

5. The device according to claim 1, wherein the device is formed from a material which is softer than the material of at least one layer that forms part of the workpiece or arrangement of workpieces.

6. The device according to claim 1, wherein the device is formed from a synthetic material.

7. The device according to claim 1, wherein the second portion is formed so as to achieve a press fit within the pilot hole.

8. A method for drilling using a drilling unit, wherein the drilling unit comprises a bush inside which a drill bit can advance and retract relative to the bush, the bush being provided with an opening from which the drill bit can protrude towards a workpiece or an arrangement of workpieces,
wherein the method comprises drilling by the drill bit including drilling through a device, and wherein drilling through the device comprises removing material of the device,
wherein the workpiece or the arrangement of workpieces comprises at least two layers of material which form a stacked arrangement, wherein prior to drilling, a first layer of the stacked arrangement comprises the pre-drilled pilot hole, and wherein prior to drilling, a second layer of the stacked arrangement covers the pre-drilled pilot hole on one side of the first layer,
wherein the device comprises a first portion formed so as to fit into the opening of the bush and wherein the device comprises a second portion formed so as to fit into and be inserted into a pre-drilled pilot hole in the workpiece or in at least one workpiece of the arrangement,
the device being a device for one-time use, and
the first portion being arranged within the opening and the second portion being arranged within the pre-drilled pilot hole.

9. The method according to claim 8, further including:
positioning the drill bit relative to the workpiece or the arrangement of workpieces by placing the bush onto the device, prior to drilling.

10. The method according to claim 8, wherein at least one of the layers is formed from a fiber-reinforced composite material, or at least one of the layers is formed from a metal material, or at least one of the layers is formed from a fiber-reinforced composite material and at least one other of the layers is formed from a metal material.

11. The method according to claim 8, wherein the first layer is formed from a fiber-reinforced composite material and the second layer is formed from a fiber-reinforced composite material, or wherein the first layer is formed from a metal material and the second layer is formed from a fiber-reinforced composite material, or wherein the first layer is formed from a fiber-reinforced composite material and the second layer is formed from a metal material, or wherein the first layer is formed from a metal material and the second layer is formed from a metal material.

12. The method according to claim 8, wherein the drilling unit is a semi-automatic drilling unit.

13. The method according to claim 8, wherein drilling by the drill bit comprises enlarging the pilot hole to obtain a hole having a desired final diameter.

14. A method for preparing a workpiece or an arrangement of workpieces for drilling, comprising inserting a second portion of a device being adapted to be used in cooperation with a drilling unit that comprises a bush inside which a drill bit can advance and retract relative to the bush, the bush being provided with an opening from which the drill bit can protrude towards a workpiece or an arrangement of workpieces, the device comprising a first portion which is formed so as to fit into the opening of the bush, and the device comprising the second portion which is formed so as to fit into a pre-drilled pilot hole in the workpiece or in at least one workpiece of the arrangement and to be inserted into the pre-drilled pilot hole, into a pre-drilled pilot hole in the workpiece or in at least one workpiece of the arrangement, thereby providing a workpiece or an arrangement of workpieces that is pre-equipped with the device for a drilling operation to be performed;
wherein the device is a device for one-time use;
wherein the first and second portions are arranged such that, during drilling into or through the workpiece or arrangement of workpieces using the drill bit, material of the device is removed by drilling through the device when the device is used in cooperation with the drilling unit; and
wherein the device further comprises a disc-shaped portion, the first and second portions axially extending from opposite sides of the disc-shaped portion.

15. The method of claim 14, wherein the second portion is formed so as to achieve a press fit within the pilot hole.

16. The method of claim 14, wherein the device is formed from a synthetic material.

* * * * *